Feb. 9, 1954 M. A. STARR 2,668,910
COSINE SWEEP CIRCUIT
Filed Nov. 5, 1945
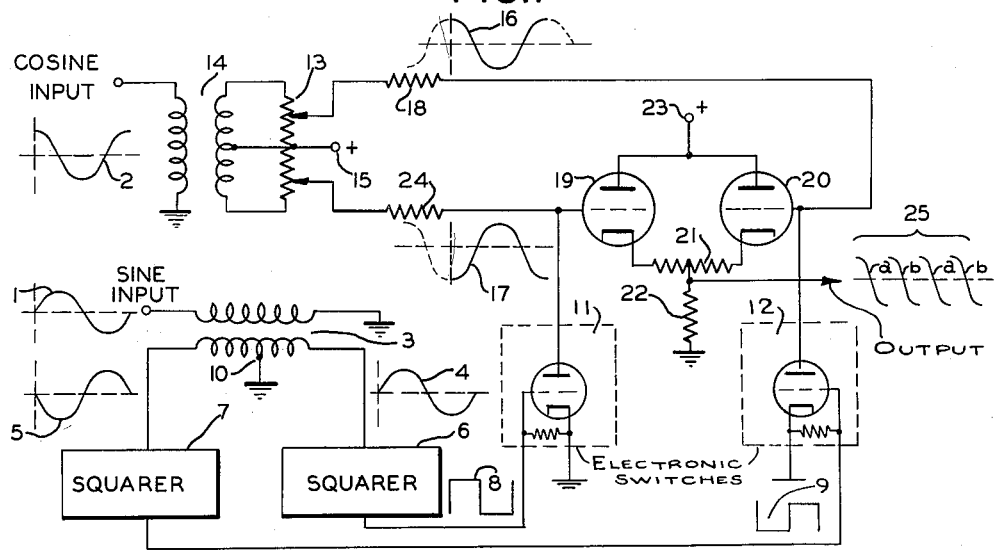
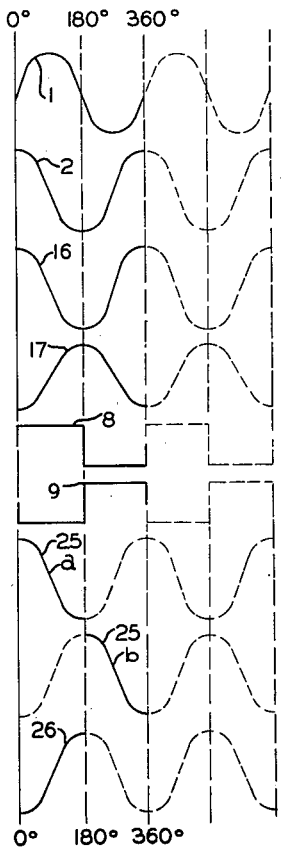
INVENTOR
MERLE A. STARR
BY
Ralph L. Chappell
ATTORNEY Patented Feb. 9, 1954

2,668,910

UNITED STATES PATENT OFFICE 2,668,910

COSINE SWEEP CIRCUIT

Merle A. Starr, Belmont, Mass.

Application November 5, 1945, Serial No. 626,846

4 Claims. (Cl. 250—27)

This invention relates to electric sweep circuits and more particularly to a circuit for producing a cosine wave repeating itself every 180° to provide a unidirectional sweep.

The conventional range sweep for a radar system B-scan presentation utilizes a linear sawtooth sweep in push-pull supply to the vertical deflection elements of a cathode ray tube, hereinafter referred to as CRT. With a linear sweep, the ranges on the CRT screen are likewise linearly delineated.

The present invention expands the range sweep at the center of the CRT screen by using a push-pull cosine sweep. The cosine sweep is telescoped at the start because it starts out with zero slope, expands at the center portion of the wave which is essentially linear, and is telescoped at the end of the sweep where the slope of the cosine wave decreases to zero at the bottom of its negative excursion.

An object of this invention is to provide a circuit for generating a sweep voltage having a cosine wave form repeating itself every 180° and thus sweeping unidirectionally.

Another object is to provide a method of expanding the central portion of a radar range sweep presented on a CRT.

Another object is to provide a B-scan radar indicating apparatus whose range presentation is expanded at the center of the screen.

These and other objects and features of this invention will become apparent upon consideration of the following detailed description when taken together with the accompanying drawings, the figures of which illustrate a typical embodiment of the invention.

Fig. 1 is a simplified circuit for producing a cosine sweep and applying it to the vertical deflection element of a CRT.

Fig. 2 illustrates the wave forms at various stages of the circuit in Fig. 1 in their proper phase relationships.

In Fig. 1, sine wave input 1 and cosine input 2 are of the same frequency. Sine input 1 is applied to the primary winding of transformer 3 whose secondary winding is center-tapped to ground at 10. Sinusoidal voltages 4 and 5, 180° out of phase, are applied from the ends of the secondary winding of transformer 3 to squarer circuits 6 and 7. Periodic square waves 8 and 9 result and are likewise 180° out of phase, but wave 8 is in phase with wave 1. Electronic switch 11 is closed by the positive gate of wave 8 and electronic switch 12 is closed by the positive gate of wave 9 so that the switches 11 and 12 alternate in operation.

The cosine input 2 is applied to the primary winding of transformer 14 whose secondary is center-tapped to a source of positive potential at 15. A potentiometer 13 is connected across the secondary of transformer 14 and is likewise center-tapped to 15. Cosinusoidal voltages 16 and 17 appear 180° out of phase at the ends of the secondary of transformer 14 and potentiometer 13, and are applied through resistors 18 and 24 respectively to the control grids of electron tubes 19 and 20. The amplitudes of voltages 16 and 17 are controlled by the slider arms of potentiometer 13. The positive potential at 15 also biases the control grids of tubes 19 and 20. The cathodes of tubes 19 and 20 are tied together through resistor 21 which is tapped to ground through output resistor 22. Plate voltage is supplied to tubes 19 and 20 at point 23.

When switch 11 closes, it grounds the control grid of 19 and cuts the tube off because of the positive cathode potential appearing across resistor 22 by reason of current conduction of tube 20. When switch 11 opens allowing tube 19 to conduct, switch 12 closes and grounds the control grid of tube 20 cutting the tube off. Thus each tube conducts for one half cycle. Since the output to the vertical deflection coil of the CRT is taken across resistor 22 in the cathode circuit of tubes 19 and 20, the output is a replica of the wave form applied to the grids of 19 and 20 during the time each tube conducts.

Referring to the wave forms in Fig. 2 as well as the circuit of Fig. 1, it will be readily apparent how the circuit produces a cosine wave 25 repeating itself every half cycle of the input wave 2. Cosine wave 16 is in phase with cosine input 2 and goes from a positive peak to a negative peak during the first half cycle from 0° to 180°. Square wave 9 is in its negative pulse from 0° to 180° so that electronic switch 12 is open and is out of the grid circuit of tube 20. During this time tube 20 conducts and reproduces in the cathode output across resistor 22 the input wave form 16 applied to its grid, as shown in wave form 25a. From 180° to 360°, square wave 9 is in its positive pulse, electronic switch 12 is closed, grounding the grid of tube 20 and eliminating signals therefrom. Now square wave 8 is in its negative pulse from 180° to 360°, opening electronic switch 11 so that the grid of tube 19 is ungrounded and 19 conducts, reproducing in its cathode circuit the signal on its grid from 180° to 360°. Cosine wave 17 is 180° out of phase with wave 16 so that from 180° to 360° it goes from a positive peak to a negative peak and since this appears on the grid of tube 19 during the time it is conducting, the output wave form 25b across the cathode resistor 22 from 180° to 360° is the same as appeared as 25a from 0° to 180° when tube 20 was conducting. Thus the circuit produces a cosine wave sweeping from a positive peak to a negative peak during each half cycle of the cosine input wave 2.

By exchanging the inputs of square waves 8 and 9 to switches 11 and 12, the output waves across resistor 22 could be made to sweep from negative peak to positive peak during each half cycle as shown in wave form 26. By applying wave 25 to one vertical deflection element and wave 26 to the other, there is provided a push-pull range sweep for the CRT beam.

Since the sweep cycle is repeated every half cycle of the input frequencies of 1 and 2, it follows that the frequency of 1 and 2 is half the pulse repetition frequency of the radar transmitter.

Although there is shown and described only a certain specific embodiment of this cosine sweep circuit, the many modifications possible thereof will be readily apparent to those familiar with the art. Therefore this invention is not to be limited except insofar as is recessitated by the prior art and the spirit of the appended claims.

What is claimed is:

1. An electric circuit for selecting and reproducing repetitively a desired portion of an input periodic wave, comprising, a source of a periodic electric wave, means for resolving said wave into a plurality of waves differing in phase, a plurality of electron tubes, each having at least a control grid and common cathode output circuit, means for applying each of said phased waves respectively to the control grid of one of said tubes, means for deriving two oppositely phased periodic square waves from said source, and a plurality of electronic switches alternately opened and closed by said square waves, each of said switches acting to apply a bias potential to one of said control grids in predetermined sequence for a predetermined time duration for each of said tubes to conduct for the time duration of said desired portion of said input wave.

2. A circuit for producing a unidirectional non-linear sweep voltage comprising, a source of cosine waves, a pair of electron tubes having at least control grids, anodes, and cathodes and biased to be conducting, means for applying oppositely phased cosine waves from said source to said control grids, and a pair of electron switches connected to ground each of said control grids alternately for each of said tubes to be non-conducting during alternate half cycles of said cosine wave whereby the output of said circuit reproduces successive half-cycle cosine waves.

3. A circuit for producing a non-linear sweep voltage having compressed ends and an expanded center portion comprising, a source of periodic alternating waves having the desired amplitude time characteristic, a pair of electron tubes each having a control grid and a common cathode output circuit, means for applying oppositely phased waves from said source to said control grids, means for generating two oppositely phased periodic square waves at the same frequency as said source, and two electronic switches alternately opened and closed in response to said square waves, said switches being connected to ground alternately said grids of each of said tubes respectively for alternate half cycles of said alternating wave source.

4. An electric sweep circuit providing a cosine wave form repeating itself every 180° and thus sweeping unidirectionally comprising, a source of cosinusoidal electric waves, means for deriving two oppositely phased cosinusoidal waves from said source, two electron tubes having control grids and a common cathode output circuit and biased to be nonconducting, means for applying said oppositely phased cosinusoidal waves to said grids respectively, means biasing each of said tubes to be conducting for 180° of the wave form of said source successively wherein said means for biasing each of said tubes to be conducting includes a source of sinusoidal electric waves, means for squaring said sinusoidal waves and deriving two oppositely phased periodic square waves, and two electronic switches alternately opened and closed each 180° by said square waves, said switches alternately grounding said grids of each of said tubes respectively to bias each of said tubes to be nonconducting for 180° successively so that the output wave form in said cathode output circuit is a replica of 180° of said cosinusoidal waves which repeats itself every 180°.

MERLE A. STARR.

References Cited in the file of this patent

UNITED STATES PATENTS

| Number | Name | Date |
| --- | --- | --- |
| 1,928,093 | Coyle | Sept. 26, 1933 |
| 2,078,644 | Swedlund | Apr. 27, 1937 |
| 2,174,386 | King | Sept. 26, 1939 |
| 2,226,459 | Bingley | Dec. 24, 1940 |
| 2,324,314 | Michel | July 13, 1943 |
| 2,399,586 | Toomim | Apr. 30, 1946 |
| 2,400,599 | Reeves | May 21, 1946 |
| 2,412,291 | Schade | Dec. 10, 1946 |
| 2,498,900 | Schoenfeld | Feb. 28, 1950 |
| 2,580,673 | Graham | Jan. 1, 1952 |